United States Patent [19]

Puetter et al.

[11] Patent Number: 4,585,536
[45] Date of Patent: Apr. 29, 1986

[54] ION EXCHANGE MEMBRANES CONSISTING OF PYRROLE POLYMERS

[75] Inventors: Hermann Puetter, Neustadt; Herbert Naarmann, Wattenheim; Klaus Penzien, Frankenthal, all of Fed. Rep. of Germany

[73] Assignee: BASF Aktiengesellschaft, Fed. Rep. of Germany

[21] Appl. No.: 603,241

[22] Filed: Apr. 23, 1984

[30] Foreign Application Priority Data

Apr. 23, 1983 [DE] Fed. Rep. of Germany ....... 3314817

[51] Int. Cl.$^4$ ............................................. B01D 57/02
[52] U.S. Cl. .................................... 204/182.3; 521/27
[58] Field of Search ............... 528/423; 521/25, 27; 204/252, 296

[56] References Cited

U.S. PATENT DOCUMENTS

4,062,745  12/1977  Buvet et al. ............... 204/131
4,401,545   8/1983  Naarmann et al. ......... 204/291
4,414,090  11/1983  D'Agostino et al. ....... 204/252

FOREIGN PATENT DOCUMENTS

263238  9/1963  Australia ..................... 528/423

OTHER PUBLICATIONS

Zinger et al., J.A.C.S. 1984 106, 6861–6863.
Burgmayer et al., J. Electroanal. Chem. 147(1983), 339–344.
Burgamayer et al., J. Amer. Chem. Society 1982 104, 6139–6140.
Journal of Polymer Science: Polymer Letters Edition, vol. 19, No. 8, pp. 395–400.

Primary Examiner—Joseph L. Schofer
Assistant Examiner—Peter F. Kulkosky
Attorney, Agent, or Firm—Keil & Weinkauf

[57] ABSTRACT

Electrochemical processes for selectively separating ions in aqueous soltuion are carried out using apparatuses in which two or more different spaces are separated by means of ion exchange membranes, and the membrane material consists of electrochemically prepared pyrrole polymers. Such ion exchange membranes are used as proton and anion exchange membranes.

6 Claims, 3 Drawing Figures

C = CATHODE
A = ANODE
M = ION EXCHANGE MEMBRANE
PP = MEMBRANE COMPOSED OF A PYRROLE POLYMER
E = ELECTROLYTE
$R_I$ = Ag/AgCl REFERENCE ELECTRODE IN SPACE I
$R_{II}$ = Ag/AgCl REFERENCE ELECTRODE IN SPACE II

ION EXCHANGE MEMBRANES CONSISTING OF PYRROLE POLYMERS

The present invention relates to apparatuses for carrying out electrochemical processes for selectively separating ions in aqueous solution, in which two or more different spaces are separated by means of an ion exchange membrane, the membrane material consisting of pyrrole polymers which have been prepared electrochemically. The present invention furthermore relates to the use of such membranes as proton and anion exchange membranes.

Ion exchange membranes are used in a variety of ways and to an increasing extent in electrolysis and electrodialysis, as separating walls in batteries and secondary batteries, and for analytical purposes. One of the most important criteria in relation to the usefulness of ion exchange membranes is their selectivity. Depending on the technical field of use, ion exchange membranes are impermeable to various ionic or non-ionic compounds to a greater or less extent, while being permeable to other compounds, generally in a very specific manner.

For example, commerical anion exchange membranes exhibit $\geq 90\%$ impermeability toward cations in dilute solutions, but are permeable to anions. This applies in the opposite sense in the case of cation exchange membranes, which are permeable to cations but not to anions. Such membranes are used, for example, in the treatment of seawater or brackish water by electrodialysis, for the preparation of table salt or the recovery of drinking water.

Normally, for example, anion exchange membranes do not exhibit any particular selectivity with regard to different anions. Such a selectivity can be achieved by specific modification; for example, there are membranes which are highly permeable to monovalent anions, but exhibit low permeability toward divalent anions.

In the regeneration or further processing of acidic waste waters containing heavy metals, it is frequently necessary to separate off the excess acid. In doing this, it is necessary to retain the metal cations quantitatively, but conventional cation exchange membranes achieve this only incompletely.

In dissolved-state secondary batteries, it is important that the redox systems in the anolyte and the catholyte do not mix as a result of diffusion through the separating wall. In this context, too, there are to date no sufficiently selective cation exchange membranes.

An important precondition with regard to the selectivity of ion exchange membranes is their bound ion content. As a rule, commercial membranes contain about 1-2 milliequivalents of bound ions per g of dry substance. The higher the concentration of these in the membrane, the higher in general is their selectivity. Regarding the selectivity, the high degree to which membranes swell constitutes a disadvantage; in the operating state, they contain as much as 40% of water, or more.

It is an object of the present invention to provide novel apparatuses for carrying out electrochemical processes for the selective separation of ions in aqueous solution, in which two or more different spaces are separated by means of an ion exchange membrane having a novel selectivity spectrum, the said apparatuses being free of the disadvantages of conventional apparatuses containing ion exchange membranes.

We have found that this object is achieved by apparatuses which contain ion exchange membranes consisting of electrochemically prepared pyrrole polymers.

The present invention furthermore relates to the use of ion exchange membranes as proton and anion exchange membranes.

The novel apparatuses, for carrying out electrochemical processes can be used, for example, for carrying out electrodialysis and electrolysis processes, in electrochemical storage devices, eg. batteries, or for carrying out electrochemical analyses. These processes employ aqueous solutions of ions. In electrodialysis processes, the diluate space and the concentrate space are separated by means of the ion exchange membrane used according to the invention. In electrolysis processes, the anolyte space and the catholyte space are separated by the membrane. The same applies in the case of electrochemical storage devices and batteries. Such processes for the selective separation of ions in aqueous solution are described in, for example, "Membrane Separation Processes", P. Meares, Ed., Elsevier, Amsterdam 1976, and "Ion Exchange Membranes", D. S. Flett, Ed., Ellis Horwood Ltd., Chichester, England (1983).

The ion exchange membranes used according to the invention are selectively permeable only to protons and small anions, in particular monovalent anions, eg. chloride, while they are substantially impermeable to cations in general and to large anions, in particular polyvalent ions, eg. sulfate, $Fe^{2+}$, $Fe^{3+}$ or $Ti^{3+}$.

It is known that, in some fields of use, pyrrole polymers behave like metals. Although metals are in general good conductors of electrons, they are unsuitable as ion exchange materials. Another possible use for polypyrrole is based on its redox properties, and it has been proposed, for example, to use polypyrrole as an electrochemical energy storage device. Because of this property, polypyrrole likewise appears to be unsuitable as an ion exchanger since it changes as a function of the (electrochemical) conditions, particularly one property, ie. its charge density, altering. For this reason, polypyrrole does not appear to be a suitable ion exchange material.

We have found that, surprisingly, films of pyrrole polymers can be used as ion exchange membranes, without noticeably displaying their metallic or redox properties, if they are brought into contact with ionic conductors, ie. if they are treated like ion exchange membranes and contact with metallic conductors is avoided.

The ion exchange membranes used according to the invention constitute a substantial technical advance. Because of their physical and chemical properties, membranes composed of pyrrole polymers are superior to conventional membranes in many respects. Their high mechanical stability permits their use without a supporting fabric otherwise usually employed for membranes, while their low water content and, consequently, their low degree of swelling make them mechanically more advantageous than conventional membranes. Unlike other membranes, they are not attacked by organic solvents, such as acetonitrile, and are hence particularly suitable for organic electrolyses. Compared with conventional membranes, they are thermally stable at temperatures which are more than 200° C. higher. They can be processed thermally, for example pressed while hot onto supporting fabric, and thus attain still higher stability, without sacrificing their membrane properties. Because of their novel selectivity profile, membranes of pyrrole polymers can be used in some interesting fields. For example, polypyrrole membranes can be employed in a unique manner as a separating wall for dissolved-state secondary batteries. For example, the use of the $Fe^{3+}/Ti^{3+}$ system as an electrical energy storage device has been proposed. In order to achieve this, it is necessary to have a separating wall which both prevents mixing of the iron and titanium ions and suppresses redox discharge of the system at the boundary surface. As demonstrated below, this effect is achieved by means of pyrrole polymer membranes.

Because of its preferential selectivity for protons, polypyrrole is a suitable membrane for the electrodialysis of acids, for example for the purification and concentration of waste sulfuric acid or for separating off acids from salt mixtures.

The films are thermally stable to 300° C., and are insensitive to air and aqueous solutions, in particular to aqueous acids. They are flexible and, like other ion exchange membranes, can be clamped between frames.

The membranes can be subjected to a current density of 0.01-50 $A/dm^2$, preferably 0.1-10 $A/dm^2$ in the case of electrodialysis, and 0.5-50 $A/dm^2$ in the case of electrolysis. The polarity of the membranes can be changed without the membranes being electrochemically modified.

The electrochemical preparation of pyrrole polymers which can be used as membrane material is known and has been described in many publications. It does not form a subject of the invention. Compounds from the class comprising the pyrroles which are suitable for the preparation of the polymers used according to the invention are pyrrole itself as well as the substituted pyrroles, eg. the N-alkylpyrroles, the N-arylpyrroles, and the pyrroles which are monoalkyl-, dialkyl-, monohalogen- or dihalogen-substituted at the carbon atoms. Pyrrole can be used alone or as a mixture with other compounds from the class comprising the pyrroles. It is preferable to use polymers of unsubstituted pyrrole itself. If polymers of substituted pyrroles are employed, preferred polymers are those of 3,4-dialkylpyrroles, in particular where alkyl is of 1 to 4 carbon atoms, and of 3,4-dihalopyrroles, in particular 3,4-dichloropyrrole.

If required, certain amounts of other compounds which are copolymerizable with pyrroles may also be present. Examples of suitable compounds of this type are cyclopentadieneazulene and its derivatives, such as benzazulene and kujaazulene, as well as fulvenes, indene and quadratic acid. Heterocyclic compounds, such as imidazole, thiazole, furan, thiophene, 2-bromothiophene, 2,6-dimethylpyridine or pyrazine, are also suitable. From 1 to 10 parts of the compounds which are copolymerizable with pyrrole can be used per 10 parts of pyrrole.

The polymerization of pyrrole or pyrrole-containing mixtures can be carried out at from −30° to 100° C., preferably from +20° to 45° C., and under from 1 to 1,000, preferably from 1 to 5, bar. Reaction times of from 0.1 to 600, preferably from 1 to 10, minutes are generally required.

The polymers are prepared by electrochemical polymerization, polymerization of the monomers being effected by anodic oxidation. This is carried out using, for example, a current density of from 2 to 20 $mA/cm^2$ and applying a voltage of in general from 10 to 300 volt. Where conductive salts are present during the polymerization, they are used in amounts of from 5 to 200 parts per 100 parts of monomers. The polymerization of pyrrole or of the mixtures of pyrrole with other compounds can be carried out in an auxiliary liquid.

The auxiliary liquids are used either as solvents or as suspending agents. For example, the pyrroles or the other monomers dissolve in the auxiliary liquids. Examples of preferred auxiliary liquids are alcohols, ethers, such as dioxane or 1,2-dimethoxyethane, glacial acetic acid, acetone, dimethylformamide and N-methylpyrrolidone. Water can be added to increase the electrical conductivity.

In choosing the amount of pyrroles or the mixture of pyrrole with other compounds and the amount of auxiliary liquid, it should be ensured that not less than 0.1 part by weight, preferably from 5 to 100 parts by weight, of auxiliary liquid are used per 100 parts by weight of pyrrole or of the pyrrole-containing mixture.

If necessary, electrolytes can be added to the polymerizing system of pyrroles and auxiliary liquid during the electrochemical polymerization process, in order to increase the conductivity. Particularly suitable compounds for this purpose are the alkali metal or ammonium salts of $PFd_6^-$, $ClO_4^-$, $BF_4^-$ and $AsF_6^-$, as well as organic acids, benzenesulfonic acid and the like. These conductive salts are known.

If required, other assistants, such as oxidizing agents, e.g. persulfates, potassium permanganate or oxygen, can be present during the polymerization.

The polymers are deposited as films on the anodes, and can be washed with solvent in order to remove adhering conductive salts. The polymers are advantageously dried at from 50° to 150° C. They are in the form of a thin film of the same size as the electrode. Advantageous membrane materials are those which are from 0.01 to 1, advantageously from 0.05 to 0.2, mm thick.

The Examples which follow illustrate other possible uses of the ion exchange membranes and the conditions relating to their use.

Figure 1:
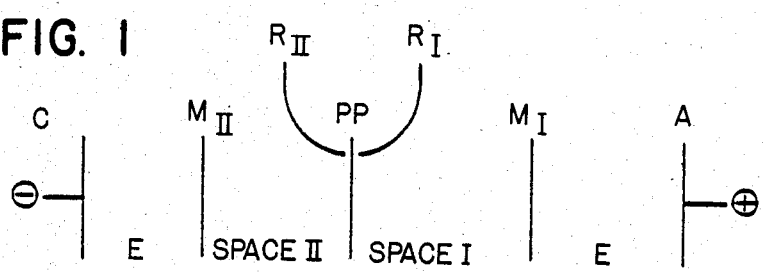
FIG. 1 shows the apparatus used in the examples.

The apparatus used in the Examples is shown in FIG. 1.

It consists of three types of spaces: the electrolyte-containing space, space I and space II. Each of these spaces is formed by means of a perspex frame (inner dimensions 3.5×5 cm) and by a membrane on one side and an electrode (electrolyte) or the pyrrole polymer membrane (space I, II) on the other side. The frames each have a feed line and an outlet line for the particular test solution.

In addition, two Luggin capillaries dip into spaces I and II and, with the aid of the reference electrodes $R_I$ and $R_{II}$, permit the decrease in potentialat the membrane to be determined as required.

The electrolyte, space I and space II are each incorporated into a cycle which consists of a stock vessel, a heat exchanger and a magnetically driven centrifugal pump. Each cycle is thermostated at 20° C.

EXAMPLES

The membranes used in Example 1 to 9 were prepared electrochemically from pure pyrrole, in accordance with German Laid-Open Application DOS No. 3,049,551, Example 1.

EXAMPLE 1

Polypyrrole (PP) was used as a proton exchange membrane. $M_I$ and $M_{II}$ were anion exchange membranes composed of crosslinked polystyrene containing trimethylammonium groups (2 meq/g of bound ions);

| Electrolyte: | 495 g of 0.95% strength $H_2SO_4$ |
|---|---|
| Space I: | 515 g of 0.94% strength $H_2SO_4$ |
| Space II: | 510 g of 0.94% strength $H_2SO_4$ |

Circulation was effected for 4 hours 10 minutes at a current of 0.5 A. At the end of this time, the $H_2SO_4$ content in space I had dropped to 0.45% and that in space II had increased to 1.45%, while the $H_2SO_4$ content in the electrolyte had remained unchanged at 0.95%. Current efficiency: 70%.

EXAMPLE 2

Selectivity $Na^\oplus/H^\oplus$

The apparatus used was that described in Example 1. $M_I$ and $M_{II}$ were identical cation exchange membranes based on perfluorinated sulfonic acids (1 meq/g of bound ions).

Figure 2:
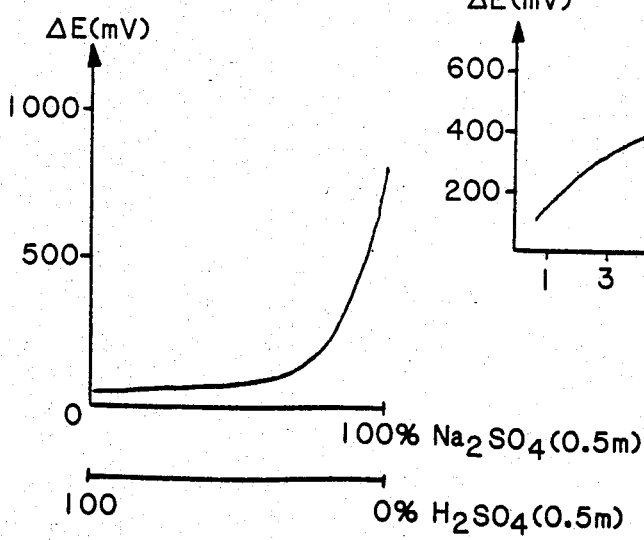
FIG. 2 shows the variation in potential as described in example two.

Cycles I and II and the electrolyte cycle were 0.5 molar $Na_2SO_4$ solution. Circulation through the spaces was effected at 0.2 A, and in spaces I and II $Na_2SO_4$ was replaced progressively with 0.5 molar $H_2SO_4$. The decrease in potential at the PP membrane was measured, the variation in potential being shown in FIG. 2.

EXAMPLE 3

Selectivity $H^+/SO_4^{2-}$

The PP membrane was composed of polypyrrole, $M_I$ was an anion exchange membrane as described in Example 1, and $M_{II}$ was a cation exchange membrane as described in Example 2.

| Electrolyte: | 400 g of 2.2% strength $H_2SO_4$ |
|---|---|
| Space I: | 500 g of 4.9% strength $H_2SO_4$ |
| Space II: | 500 g of 5.0% strength $H_2SO_4$ |

Electrodialysis was carried out for 4.25 hours at a current of 0.5 A. At the end of this time, the $H_2SO_4$ content in the electrolyte had increased to 3.1% and that in space I had dropped to 4.20%, while the $H_2SO_4$ concentration in space II had remained constant at 5.0%. Polypyrrole acts as a proton exchange membrane and has a selectivity of $\geq 90\%$.

EXAMPLE 4

Polypyrrole as a separating wall for redox systems

The apparatus used was that described in Example 1.

| Electrolyte: | 500 g of 3% strength $H_2SO_4$ |
|---|---|
| Space I: | 20.2 g (0.05 mole) of cerium (IV) sulfate, 250 g of 10% strength $H_2SO_4$ and 230 g of $H_2O$ |
| Space II: | 500 g of 0.1 N iron ammonium sulfate solution |

Circulation through the spaces was effected electrolessly for 1.5 hours, no decrease in the cerium(IV) content being observed (titration against iron ammonium sulfate).

EXAMPLE 5

Polypyrrole as a separating wall for redox systems

The apparatus used was that described in Example 1.

| Electrolyte: | 2.5% strength $H_2SO_4$ | |
|---|---|---|
| Space I: | 0.1 N $FeSO_4$ | 500 g each |
| Space II: | 0.1 N $Fe_2(SO_4)_3$ | |

The solutions were circulated, and the content of $Fe^{2+}$ in space I remained constant over the test period of 3 days.

EXAMPLE 6

Polypyrrole as a separating wall in a dissolved-state secondary battery

The apparatus was simplified so that the electrolyte space and hence the two frames and the membranes M were absent.

| Space I: | $TiCl_3$ in concentrated HCl (8.00% of Ti) | 500 g each |
|---|---|---|
| Space II: | $FeCl_3$ in 20% strength HCl (15.7% of Fe) | |

The solution was circulated. A terminal voltage of 0.35 V was measured, and a constant current of 0.01 A was obtained through an 11 $\Omega$ resistance. A decrease in potential of 0.30 V was measured at the polypyrrole film in the unloaded state.

After 2 days, the Ti content in the $FeCl_3$ solution and the Fe content in the $TiCl_3$ solution were determined, and were found to be below the detection limit (<0.001%) in each case. The impermeability to $Fe^{3+}$ and $Ti^{3+}$ was therefore quantitative within the error limit.

EXAMPLE 7

Polypyrrole as a pH indicator membrane

Figure 3:
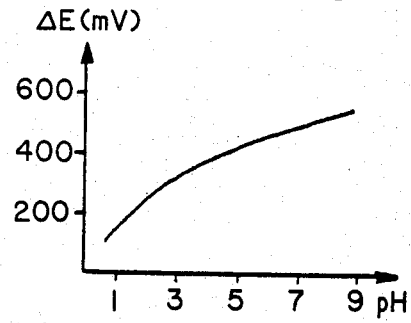
FIG. 3 shows the membrane potential as a function of pH as described in example 7.

The apparatus used was that described in Example 1, and the electrolyte consisted of 500 g of 5% strength $Na_2SO_4$ solution. In spaces I and II, mixture of NaCl and HCl were used, the chloride concentration being constant at 0.1 mole/kg. The membrane potential as a function of pH was determined at 0.05 A, and the pH/mV curve is shown in FIG. 3.

EXAMPLE 8

Polypyrrole as an anion exchange membrane

The apparatus used was that described in Example 3.

| Electrolyte: | 5% strength $Na_2SO_4$ | |
|---|---|---|
| Space I: | 5% strength NaCl | 500 g each |
| Space II: | 5% strength NaCl | |

Circulation was effected at 1.0 A ($\triangleq$ 7.2 A/dm$^2$). After 3 hours, the chloride content in space II had decreased from 3.20% to 2.80% and that in the electrolyte was 0.45%, while the chloride concentration in space I had remained unchanged. The selectivity of the polypyrrole membrane was therefore the same as the selectivity of the anion exchange membrane $M_I$ ($\geq 90\%$).

EXAMPLE 9

Selectivity chloride/sulfate

The apparatus used was that described in Example 1.

| Electrolyte: | 2% strength Na₂SO₄ solution | |
|---|---|---|
| Space I: | 2% strength Na₂SO₄ solution | 500 g each |
| Space II: | solution containing 2% of Na₂SO₄ + 1.3% of NaCl | |

Electrodialysis was carried out for 15 hours at a mean current of 0.07 A. At the end of the experiment, the $Cl^\ominus$ concentration in space II had decreased from 0.8 to 0.51%, corresponding to a current efficiency of 100%, based on the transport of $Cl^\ominus$.

EXAMPLE 10

Use of an ion exchange membrane PP composed of 50% of pyrrole and 50% of furan

The apparatus used was that described in Example 1, $M_I$ and $M_{II}$ being cation exchange membranes.

| Electrolyte: | 5% strength H₂SO₄ | |
|---|---|---|
| Space I: | 5% strength H₂SO₄ | 800 g each |
| Space II: | 5% strength H₂SO₄ | |

Current/membrane potential variation:

| i [A] | ΔU [mV] | ΔU$^{(a)}$ [mV] |
|---|---|---|
| 0 | 0 | 0 |
| 0.2 | −38 | 34 |
| 0.4 | −77 | 71 |
| 0.6 | −115 | 107 |
| 0.8 | −152 | 142 |
| 1.0 | −183 | 175 |

$^{(a)}$The polarity of the electrodes was changed in this case.

Electrolysis was carried out for 8 hours at a current of 1 A, and the H₂SO₄ concentration in space I and space II remained constant at the initial values, within the error limit (±0.1%). The selectivity $H^+ SO_4^{2-}$ was therefore 95%.

EXAMPLE 11(a)

The apparatus used was that described in Example 10.

| Electrolyte: | 15% strength H₂SO₄ | |
|---|---|---|
| Space I: | 3.5% strength HCl | 800 ml each |
| Space II: | 3.5% strength HCl | |

Current/membrane potential variation:

| i [A] | ΔU [mV] | ΔU$^{(a)}$ [mV] |
|---|---|---|
| 0 | 0 | 0 |
| 0.2 | −25 | 27 |
| 0.4 | −53 | 56 |
| 0.6 | −80 | 84 |
| 0.8 | −107 | 112 |
| 1.0 | −133 | 138 |

$^{(a)}$The polarity of the electrodes was changed in this case

Electrolysis was carried out for 8 hours 10 minutes at a current of 1 A. After this time, the $Cl^\ominus$ concentration in space II had decreased from an initial value of 3.43% to 3.14%, while that in space I had increased from 3.46% to 4.03%.

The current efficiency was therefore about 30%, based on the transport of $Cl^\ominus$, and the $H^\oplus/Cl^\ominus$ selectivity was 70%.

EXAMPLE 11(b)

| Electrolyte: | 5% strength Na₂SO₄ | |
|---|---|---|
| Space I: | 6% strength NaCl | 800 g each |
| Space II: | 6% strength NaCl | |

Current/membrane potential variation:

| i [A] | ΔU [mV] | ΔU$^{(a)}$ [mV] |
|---|---|---|
| 0 | 0 | 0 |
| 0.2 | −87 | 88 |
| 0.4 | −177 | 185 |
| 0.6 | −263 | 282 |
| 0.8 | −347 | 387 |
| 1.0 | −428 | 493 |

$^{(a)}$The polarity of the electrodes was changed in this case.

Electrodialysis was carried out for 2 hours 45 minutes at a current of 1 A. In this time, the $Cl^\ominus$ concentration in space II decreased from 3.66% to 3.33%, and that in space I increased from 3.63% to 4.04%.

The current efficiency was therefore about 90%, based on the transport of $Cl^\ominus$. Because of the slight shifts in pH in all the spaces ($H^\oplus$ transport), it is not possible to state an exact $Cl^\ominus/Na^\oplus$ selectivity.

EXAMPLE 12

Use of an ion exchange membrane PP composed of a copolymer of 50% of pyrrole and 50% of thiophene The apparatus used was that described in Example 11.

| 12(a) Electrolyte: | 5% strength H₂SO₄ | |
|---|---|---|
| Space I: | 5% strength H₂SO₄ | 800 g each |
| Space II: | 5% strength H₂SO₄ | |

Current/membrane potential variation:

| i [A] | ΔU [mV] | ΔU$^{(a)}$ [mV] |
|---|---|---|
| 0 | 0 | 0 |
| 0.2 | −44 | 42 |
| 0.4 | −89 | 88 |
| 0.6 | −133 | 133 |
| 0.8 | −176 | 179 |
| 1.0 | −218 | 225 |

Electrolysis was carried out for 7 hours 20 minutes at a current of 1 A, and the H₂SO₄ concentration in space I and space Ii remained constant within the error limit (±0.1%).

| 12(b) Electrolyte: | 5% strength H₂SO₄ | |
|---|---|---|
| Space I: | 3.5% strength HCl | 800 ml each |
| Space II: | 3.5% strength HCl | |

Current/membrane potential variation:

| i [A] | ΔU [mV] | ΔU$^{(a)}$ [mV] |
|---|---|---|
| 0 | 0 | 0 |

-continued

| i [A] | ΔU [mV] | ΔU$^{(a)}$ [mV] |
|---|---|---|
| 0.2 | −20 | −20 |
| 0.4 | −42 | −43 |
| 0.6 | −62 | −65 |
| 0.8 | −84 | −86 |
| 1.0 | −102 | −100 |

Electrodialysis was carried out for 6 hours at a current of 1 A. After this time, the $Cl^{\ominus}$ concentration in space II had decreased from 3.72% to 3.29%, and that in space I had increased from 3.71% to 4.17%. The current efficiency was therefore about 45%, based on the transport of $Cl^{\ominus}$.

| 12(c) Electrolyte: | 807 g of 5% strength Na$_2$SO$_4$ |
|---|---|
| Space II: | 710 g of 6% strength NaCl |
| Space I: | 710 g of 6% strength NaCl |

Current/membrane potential variation:

| i [A] | ΔU [mV] | ΔU$^{(a)}$ [mV] |
|---|---|---|
| 0 | 0 | 0 |
| 0.2 | −84 | 87 |
| 0.4 | −174 | 179 |
| 0.6 | −261 | 274 |
| 0.8 | −342 | 375 |
| 1.0 | −432 | 468 |

Electrodialysis was carried out for 6 hours 50 minutes at a current of 1 A. After this time, the $Cl^{\ominus}$ concentration in space II had decreased from an initial value of 3.74% to 2.60%, and that in space I had increased from 3.68% to 4.55%. The current efficiency was therefore about 80%, based on the transport of $Cl^{\ominus}$.

EXAMPLE 13

Use of an ion exchange membrane PP composed of a copolymer of 50% of pyrrole and 50% of N-methylpyrrole The apparatus used was that described in Example 11

| 13(a) Electrolyte: | 8% strength H$_2$SO$_4$ | |
|---|---|---|
| Space I: | 8% strength H$_2$SO$_4$ | 800 g each |
| Space II: | 5% strength H$_2$SO$_4$ | |

Current/membrane potential variation:

| i [A] | ΔU [mV] | ΔU$^{(a)}$ [mV] |
|---|---|---|
| 0 | 0 | 0 |
| 0.2 | 18 | 19 |
| 0.4 | 39 | 39 |
| 0.6 | 58 | 58 |
| 0.8 | 78 | 77 |
| 1.0 | 98 | 95 |

$^{(a)}$The polarity of the electrodes was changed in this case.

Electrodialysis was carried out for 7 hours 50 minutes at a current of 1 A. Within the error limit (±0.1%), the relative H$_2$SO$_4$ concentrations in the spaces I and II had not changed.

| 13(b) Electrolyte: | 5% strength H$_2$SO$_4$ |
|---|---|
| Space I: | 3.5% strength HCl |
| Space II: | 3.5% strength HCl |

Current/membrane potential variation:

| i [A] | ΔU [mV] | ΔU$^{(a)}$ [mV] |
|---|---|---|
| 0 | 0 | 0 |
| 0.2 | −17 | 18 |
| 0.4 | −34 | 35 |
| 0.6 | −52 | 52 |
| 0.8 | −69 | 70 |
| 1.0 | −85 | 88 |

Electrodialysis was carried out for 8 hours at a current of 1 A. The $Cl^-$ concentration in space II decreased from 2.30% to 1.41%, and that in space I had increased from 2.32% to 3.24%. The current efficiency was therefore about 70%, based on the transport of $Cl^-$.

| 13(c) Electrolyte: | 5% strength Na$_2$SO$_4$ | |
|---|---|---|
| Space I: | 6% strength NaCl | 800 g each |
| Space II: | 6% strength NaCl | |

Current/membrane potential variation:

| i [A] | ΔU [mV] | ΔU$^{(a)}$ [mV] |
|---|---|---|
| 0 | 0 | 0 |
| 0.2 | −58 | 58 |
| 0.4 | −118 | 118 |
| 0.6 | −172 | 178 |
| 0.8 | −227 | 239 |
| 1.0 | −278 | 298 |

$^{(a)}$The polarity of the electrodes was changed in this case

Electrodialysis was carried out for 7.5 hours at a current of 1 A. The $Cl^{\ominus}$ concentration in space II decreased from 3.70% to 3.00%, and that in space I increased from 3.79% to 4.44%. The current efficiency was therefore about 60%, based on the transport of $Cl^{\ominus}$.

We claim:

1. Apparatus for carrying out an electrochemical process for selectively separating ions in aqueous solution, in which two or more different spaces are separated by means of an ion exchange membrane, wherein the ion exchange membrane material consists of a pyrrole polymer which has been prepared by anodic oxidation of the monomers.

2. An electrochemical process for selectively separating ions in an aqueous solution which comprises: applying an electrical current to the aqueous solution of ions in a vessel having spaces separated by an ion exchange membrane composed of an electrochemically prepared pyrrole polymer, whereby the ions are selectively passed from one space to another space through said membrane.

3. The process of claim 2, wherein the process is an electrodialysis process and the vessel contains a diluate space and a concentrate space.

4. The process of claim 2, wherein the process is an electrolysis process and the vessel contains an anolyte space and a catholyte space.

5. The process of claim 2, wherein the aqueous solution contains protons and cations and wherein the protons are selectively passed from one space to another space through the membrane.

6. The process of claim 2, wherein the solution of ions contains monovalent anions and cations and wherein the monovalent anions are selectively passed from one space to another space through said membrane.

* * * * *